(12) United States Patent
Shimizu (10) Patent No.: US 12,343,764 B2
(45) Date of Patent: Jul. 1, 2025

(54) ELECTRIC WIRE PROCESSING APPARATUS

(71) Applicant: Shinmaywa Industries, Ltd., Takarazuka (JP)

(72) Inventor: Nozomi Shimizu, Takarazuka (JP)

(73) Assignee: Shinmaywa Industries, Ltd., Hyogo (JP)

( * ) Notice: Subject to any disclaimer, the term of this patent is extended or adjusted under 35 U.S.C. 154(b) by 601 days.

(21) Appl. No.: 17/607,067

(22) PCT Filed: May 14, 2020

(86) PCT No.: PCT/JP2020/019203
§ 371 (c)(1),
(2) Date: Oct. 28, 2021

(87) PCT Pub. No.: WO2020/241270
PCT Pub. Date: Dec. 3, 2020

(65) Prior Publication Data
US 2022/0231492 A1    Jul. 21, 2022

(30) Foreign Application Priority Data
May 30, 2019   (JP) ................................. 2019-101412

(51) Int. Cl.
*B07C 5/36*        (2006.01)
*B23Q 7/12*       (2006.01)
(Continued)

(52) U.S. Cl.
CPC ............... *B07C 5/36* (2013.01); *B23Q 7/12* (2013.01); *H01B 13/0003* (2013.01);
(Continued)

(58) Field of Classification Search
CPC ............. H02G 1/1256; H01B 13/0003; Y10T 29/49764–4978; Y10T 29/514;
(Continued)

(56) References Cited

U.S. PATENT DOCUMENTS 3,631,979 A * 1/1972 Frankiewicz ........ G03D 15/005
                                                209/591
3,645,156 A * 2/1972 Meyer ................... H02G 1/1258
                                                83/924
(Continued)

FOREIGN PATENT DOCUMENTS

CN         103415966 A      11/2013
CN         104867625 A       8/2015
(Continued)

OTHER PUBLICATIONS

Official Communication issued in corresponding European Patent Application No. 20814473.3, mailed on Jun. 10, 2022.
(Continued)

*Primary Examiner* — Sunil K Singh
*Assistant Examiner* — Michael Vitale
(74) *Attorney, Agent, or Firm* — Keating & Bennett, LLP (57) ABSTRACT

An electric wire processing apparatus (1) includes: a clamp (3R) to grip and convey an electric wire (5); an upper tray (21) disposed under a movement path (51t) for a first end (51) of the electric wire (5); a nonconforming item tray (23) disposed under the movement path (51t) and laterally of the upper tray (21); a shared tray (24) disposed toward a second end (52) of the electric wire (5) relative to the upper tray (21) and the nonconforming item tray (23); a conforming/nonconforming determiner (14) to determine whether the electric wire (5) has been processed successfully; and a controller (9) to cause, upon determination by the conforming/nonconforming determiner (14) that the electric wire is a conforming item, the clamp (3R) to release its grip on the first end (51) of the electric wire (5) when the first end (51) is located over the upper tray (21), and to cause, upon determination by the conforming/nonconforming determiner (14) that the electric wire is a nonconforming item, the clamp (3R) to release its grip on the first end (51) of the
(Continued)

electric wire (5) when the first end (51) is located over the nonconforming item tray (23).

5 Claims, 7 Drawing Sheets (51) Int. Cl.
*H01B 13/00* (2006.01)
*H02G 1/12* (2006.01)

(52) U.S. Cl.
CPC .......... *H02G 1/1256* (2013.01); *Y10T 29/514* (2015.01); *Y10T 29/5187* (2015.01); *Y10T 29/5193* (2015.01); *Y10T 29/53209* (2015.01)

(58) Field of Classification Search
CPC ........... Y10T 29/5193; Y10T 29/53209; Y10T 29/49002–49227; Y10T 29/5136–5145; Y10T 29/5187; H01R 43/0486; H01R 43/0488; H01R 43/052–058; B07C 3/02; B07C 5/36; B23Q 7/12
USPC ............... 29/33 M, 407.01–407.1, 747, 33 F, 29/564–564.8, 592.1–887; 81/9.51
See application file for complete search history.

(56) References Cited

U.S. PATENT DOCUMENTS

| 3,861,018 | A | * | 1/1975 | Matsuura | ............. | H01R 43/052 |
| | | | | | | 29/757 |
| 4,345,362 | A | * | 8/1982 | de Givry | ............. | H02G 1/1265 |
| | | | | | | 81/9.51 |
| 5,040,440 | A | * | 8/1991 | Harvey | .................... | B23Q 7/12 |
| | | | | | | 209/657 |
| 6,212,757 | B1 | * | 4/2001 | Hasegawa | .............. | H01R 43/05 |
| | | | | | | 29/33 M |
| 6,279,215 | B1 | * | 8/2001 | Nomoto | ................ | H01R 43/052 |
| | | | | | | 29/748 |
| 8,671,558 | B2 | * | 3/2014 | Kihara | ................. | H01R 43/052 |
| | | | | | | 29/760 |
| 2005/0050722 | A1 | * | 3/2005 | Viviroli | ................ | H01R 43/052 |
| | | | | | | 29/748 |
| 2007/0101570 | A1 | * | 5/2007 | Conte | ................ | H01R 43/0486 |
| | | | | | | 29/748 |
| 2013/0125710 | A1 | * | 5/2013 | Hombu | ................. | H01R 43/28 |
| | | | | | | 81/9.51 |
| 2017/0369272 | A1 | * | 12/2017 | Helmick | ................ | H01R 43/28 |
| 2018/0257903 | A1 | | 9/2018 | Takada | | |

FOREIGN PATENT DOCUMENTS

| CN | 204706757 U | | 10/2015 | | |
| CN | 108780685 A | | 11/2018 | | |
| EP | 2 827 345 A1 | | 1/2015 | | |
| JP | 07236214 A | * | 9/1995 | ........... | H02G 1/1256 |
| JP | 11299036 A | * | 10/1999 | ........... | H02G 1/1256 |
| JP | 2011122873 A | * | 6/2011 | ........... | H02G 1/1256 |
| JP | 2011-210460 A | | 10/2011 | | |
| JP | 2012-204112 A | | 10/2012 | | |
| JP | 2014067684 A | * | 4/2014 | | |
| JP | 2015-104274 A | | 6/2015 | | |
| JP | 5922768 B2 | * | 5/2016 | ............. | H01R 43/28 |
| WO | 2011/158527 A1 | | 12/2011 | | |
| WO | 2013/069082 A1 | | 5/2013 | | |
| WO | 2013/183120 A1 | | 12/2013 | | |
| WO | WO-2014002721 A1 | * | 1/2014 | ........... | H02G 1/1256 |

OTHER PUBLICATIONS

Official Communication issued in International Patent Application No. PCT/JP2020/019203, mailed on Jul. 21, 2020.
Official Communication issued in corresponding Chinese Patent Application No. 202080033358.8, mailed on Apr. 28, 2023.

\* cited by examiner

ELECTRIC WIRE PROCESSING APPARATUS

TECHNICAL FIELD

The present invention relates to electric wire processing apparatuses.

BACKGROUND ART

Electric wire processing apparatuses to perform various processes on electric wires are known in the related art. For example, a known electric wire processing apparatus performs a process, such as cutting, insulator stripping, seal fitting, or terminal crimping, on electric wires each including a core and an insulator surrounding the core. Another known electric wire processing apparatus is configured to detect whether electric wires have been processed properly and collect the electric wires such that the electric wires are sorted into conforming and nonconforming items.

JP 2011-210460 A, for example, discloses such an electric wire processing apparatus. The electric wire processing apparatus disclosed in JP 2011-210460 A includes: a clamp that turns while gripping one end of an electric wire; a product tray to collect a conforming item; and a nonconforming item tray to collect a nonconforming item. The electric wire processing apparatus collects conforming and nonconforming items into different trays so as to prevent mixing of the conforming and nonconforming items.

CITATION LIST

Patent Literature

[Patent Literature 1] JP 2011-210460 A

SUMMARY OF INVENTION

Technical Problem

When an electric wire is long, however, conveying a first end of the electric wire by turning of the clamp makes a second end of the electric wire less movable than the first end of the electric wire; thus, it is not necessarily easy to collect an entirety of the electric wire into the product tray or the nonconforming item tray with accuracy. For example, when a nonconforming item is to be collected into the nonconforming item tray, a first end of the nonconforming item may be collected into the nonconforming item tray, but a second end of the nonconforming item may unfortunately be collected into the product tray by mistake. In this case, the nonconforming item may temporarily run onto a boundary region between the nonconforming item tray and the product tray while being collected into the nonconforming item tray, and then the first end may be pulled toward the second end and transferred from the nonconforming item tray to the product tray. As a result, the nonconforming item may be collected into the product tray by mistake. The above-described apparatus may thus fail to appropriately sort a long electric wire into a conforming or nonconforming item.

The present invention has been made in view of the above points, and its object is to provide an electric wire processing apparatus that would be able to collect an electric wire such that the electric wire is appropriately sorted into a conforming or nonconforming item if the electric wire is long.

Solution to Problem

An electric wire processing apparatus disclosed herein includes: a processor to perform a predetermined process on an electric wire including a first end and a second end; a conforming/nonconforming determiner to determine whether the process has been performed successfully; a clamp to grip a portion of the electric wire adjacent to the first end, the clamp being movable so as to convey the first end of the electric wire; a conforming item collector disposed under a movement path for the first end of the electric wire that is being conveyed by the clamp, the conforming item collector being configured to collect a first end side portion of the electric wire determined to be a conforming item by the conforming/nonconforming determiner; a nonconforming item collector disposed under the movement path for the first end of the electric wire that is being conveyed by the clamp, the nonconforming item collector being configured to collect a first end side portion of the electric wire determined to be a nonconforming item by the conforming/nonconforming determiner; a shared collector disposed toward the second end of the electric wire relative to the conforming item collector and the nonconforming item collector, the shared collector being configured to collect a remaining portion of the electric wire determined to be a conforming item by the conforming/nonconforming determiner and a remaining portion of the electric wire determined to be a nonconforming item by the conforming/nonconforming determiner; and a clamp controller to cause, upon determination by the conforming/nonconforming determiner that the electric wire is a conforming item, the clamp to release its grip on the first end of the electric wire when the first end is located over the conforming item collector, and to cause, upon determination by the conforming/nonconforming determiner that the electric wire is a nonconforming item, the clamp to release its grip on the first end of the electric wire when the first end is located over the nonconforming item collector. As used herein, the term "portion of the electric wire adjacent to the first end" refers to a portion of the electric wire located toward the first end relative to the longitudinal center of the electric wire.

The electric wire processing apparatus described above causes the portion of the electric wire adjacent to the first end to be gripped by the clamp and conveyed in accordance with movement of the clamp. The first end side portion of the electric wire determined to be conforming by the conforming/nonconforming determiner (hereinafter simply referred to as a "conforming item") is collected into the conforming item collector. The first end side portion of the electric wire determined to be nonconforming by the conforming/nonconforming determiner (hereinafter simply referred to as a "nonconforming item") is collected into the nonconforming item collector. The conforming and nonconforming items are collected such that the first end side portion of the conforming item and the first end side portion of the nonconforming item are accurately sorted from each other. The remaining portion of the conforming item and the remaining portion of the nonconforming item are both collected into the shared collector. The electric wire processing apparatus thus eliminates the possibility of collecting the portion of the electric wire adjacent to the second end into a wrong place. Accordingly, the electric wire processing apparatus reduces the possibility that the portion of the conforming item adjacent to the first end will be pulled toward the second end and transferred from the conforming item collector to the nonconforming item collector. The electric wire processing apparatus also reduces the possibility that the portion of the nonconforming item adjacent to the first end will be pulled toward the second end and transferred from the nonconforming item collector to the conforming item collector. When the electric wire is long, the electric wire processing apparatus does not necessarily have to sort an entirety of the electric wire. The electric wire processing apparatus is able to make a clear distinction between the conforming and nonconforming items as a whole by sorting a portion of the electric wire. The electric wire processing apparatus accurately sorts the first end side portion of the conforming item from the first end side portion of the nonconforming item and is thus able to make a clear distinction between the conforming and nonconforming items as a whole. Consequently, the electric wire processing apparatus is able to appropriately sort the conforming item from the nonconforming item.

In a preferred embodiment, the processor is configured to perform the predetermined process on the first end of the electric wire gripped by the clamp.

The clamp may receive the processed electric wire from another clamp that grips the electric wire during processing of the electric wire by the processor. In the above embodiment, the clamp grips the electric wire during processing of the electric wire by the processor. The above embodiment thus eliminates the need to pass the electric wire between the clamps or reduces the number of times the electric wire is to be passed between the clamps, resulting in increased electric wire processing efficiency.

In a preferred embodiment, the electric wire processing apparatus includes a partition wall disposed between the conforming item collector and the nonconforming item collector and extending in an up-down direction.

In the above embodiment, the first end side portion of the conforming item is accurately sorted from the first end side portion of the nonconforming item with the partition wall.

In a preferred embodiment, an upper edge of the partition wall includes an inclined portion that inclines downward as it extends toward the shared collector.

The electric wire that is long may sway when the electric wire falls upon being released from the clamp. In such a case, the portion of the electric wire adjacent to the first end may bend and fall on the upper edge of the partition wall. In the above embodiment, however, the upper edge of the partition wall includes the inclined portion. Thus, when the portion of the electric wire adjacent to the first end has fallen on the inclined portion, the portion then slides down along the inclination of the inclined portion. Accordingly, the electric wire processing apparatus is able to successfully collect the first end side portion of the electric wire into the conforming item collector or the nonconforming item collector.

In a preferred embodiment, the conforming item collector includes: an upper collector to collect the first end side portion of the electric wire and allow the collected portion of the electric wire to fall; and a lower collector disposed under the upper collector, the lower collector being configured to collect the portion of the electric wire that has fallen from the upper collector.

In the above embodiment, the first end side portion of the conforming item that has been collected into the upper collector is transferrable to the lower collector. Accordingly, during removal of the conforming item from the lower collector and the shared collector, the electric wire processing apparatus is able to collect the first end side portion of another conforming item into the upper collector. Consequently, the electric wire processing apparatus enables collection of one conforming item and removal of another conforming item to be carried out simultaneously, resulting in an increase in the efficiency of electric wire sorting operation.

The electric wire is not limited to any particular type of electric wire. The process to be performed on the electric wire is not limited to any particular process. The electric wire may include: a core made of a conductor; and an insulator surrounding the core. The processor may include at least one of: a device to cut the electric wire so as to provide the first end; a device to strip the insulator from the first end of the electric wire; a device to fit a seal to the first end of the electric wire; and a device to crimp a terminal to the first end of the electric wire.

Although the direction of movement of the clamp is not limited to any particular direction, the above-described effects will be particularly pronounced when the clamp is configured to turn around a vertical line.

Effects of Invention

The present invention provides an electric wire processing apparatus that would be able to collect an electric wire such that the electric wire is appropriately sorted into a conforming or nonconforming item if the electric wire is long.

DESCRIPTION OF EMBODIMENTS

Figure 1:
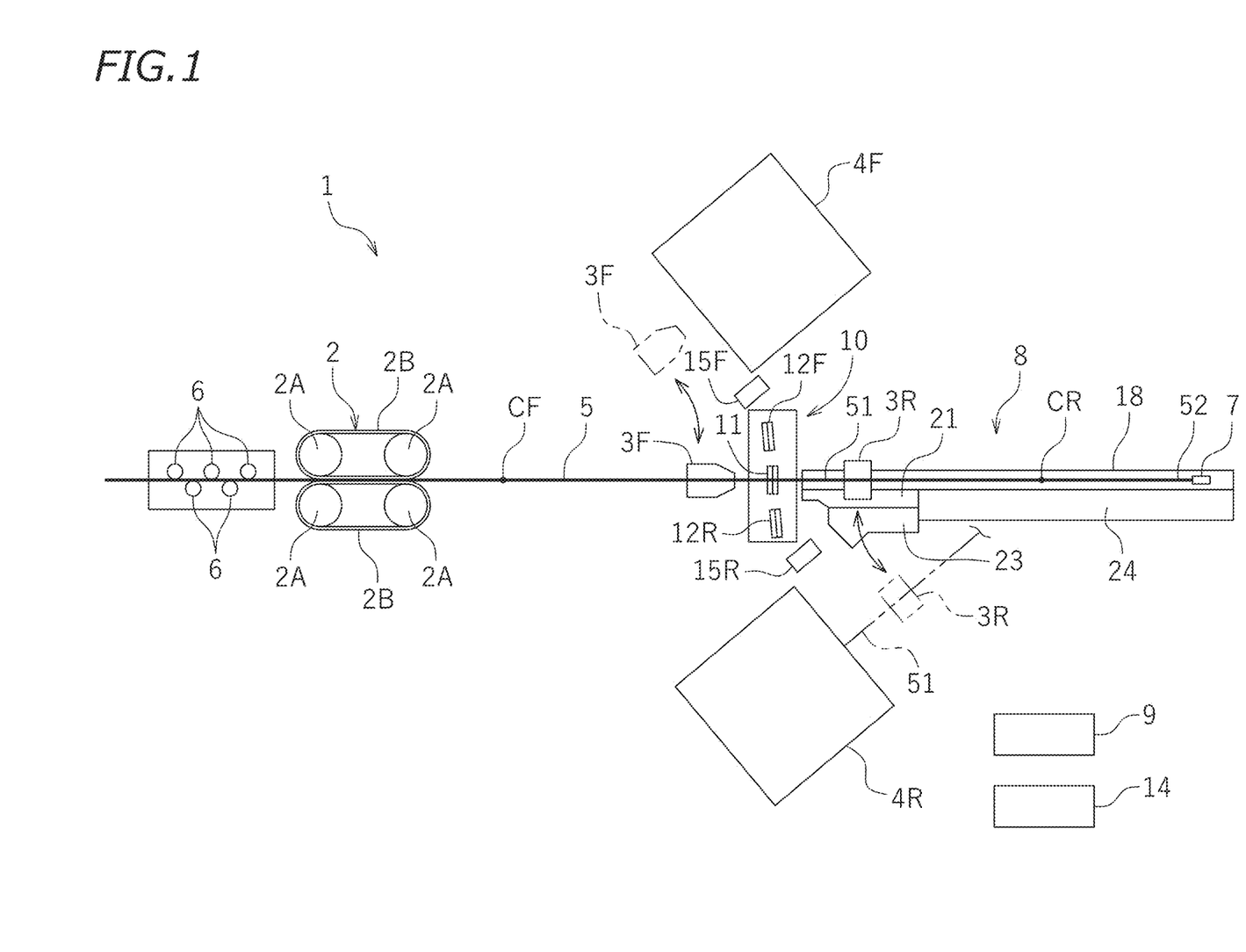
FIG. 1 is a plan view schematically illustrating the arrangement of an electric wire processing apparatus according to one embodiment.

An embodiment of the present invention will now be described. FIG. 1 is a plan view schematically illustrating the arrangement of an electric wire processing apparatus 1 according to the present embodiment. In the following description, the right and left sides in FIG. 1 are defined as the front and rear sides, respectively, and the upper and lower sides in FIG. 1 are defined as the right and left sides, respectively. These directions, however, are defined merely for the sake of convenience of description and do not limit, for example, where the electric wire processing apparatus 1 may be installed.

Figure 2:
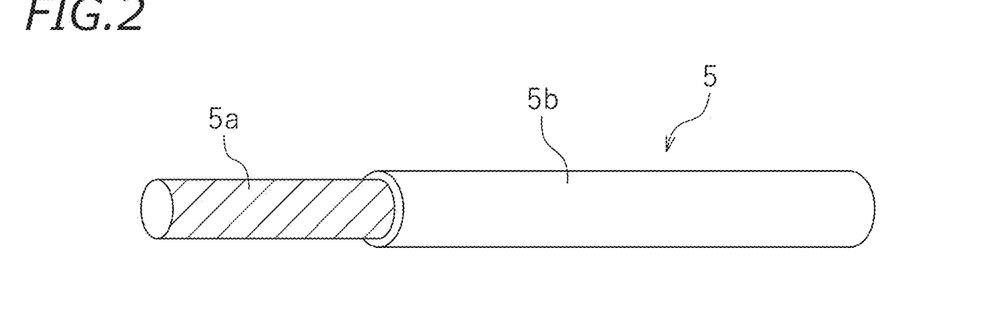
FIG. 2 is a perspective view schematically illustrating an electric wire.

As illustrated in FIG. 2, an electric wire 5 is a "coated electric wire". The electric wire 5 includes: a core 5a made of a conductor, such as metal; and an insulator 5b made of a resin or other material surrounding the core 5a.

As illustrated in FIG. 1, the electric wire processing apparatus 1 includes: straightening rollers 6 to smooth the curves of the electric wire 5; a feeder 2 to feed the electric wire 5; clamps 3F and 3R to grip the electric wire 5; a conveyance belt 18 to convey the electric wire 5 forward; a cutter device 10; seal fitters 15F and 15R to fit waterproof seals (not illustrated) to the electric wire 5; terminal crimpers 4F and 4R to crimp terminals 7 to the electric wire 5; a collecting device 8 to collect the electric wire 5 that has been processed; and a controller 9.

The feeder 2 is not limited to any particular arrangement. In this embodiment, the feeder 2 includes: a pair of right front and right rear pulleys 2A; a right conveyance belt 2B wound around the right front and right rear pulleys 2A; a pair of left front and left rear pulleys 2A; and a left conveyance belt 2B wound around the left front and left rear pulleys 2A. Although not illustrated, at least one of the pulleys 2A is connected with a motor. Driving the motor rotates the pulleys 2A, causing the conveyance belts 2B to circulate. The electric wire 5 sandwiched between the right and left conveyance belts 2B is thus fed forward.

The cutter device 10 includes: a cutting edge 11 to cut the electric wire 5; and stripping edges 12R and 12F to strip the insulator 5b from the electric wire 5. The stripping edge 12F, the cutting edge 11, and the stripping edge 12R are disposed side by side in a transverse direction.

The electric wire processing apparatus 1 is able to perform the processes of: cutting the electric wire 5; stripping the insulator 5b from the electric wire 5; fitting waterproof seals to the electric wire 5; and crimping the terminals 7 to the ends of the electric wire 5. The cutting edge 11 is an example of a processor to cut the electric wire 5. The stripping edges 12R and 12F are each an example of a processor to strip the insulator 5b from the electric wire 5. The seal fitters 15F and 15R are each an example of a processor to fit a waterproof seal to the electric wire 5. The terminal crimpers 4F and 4R are each an example of a processor to crimp the terminal 7 to the end of the electric wire 5. The electric wire processing apparatus 1 does not necessarily have to perform all of the processes just mentioned. The electric wire processing apparatus includes a device to perform at least one of the processes.

The conveyance belt 18 is disposed forward of the cutter device 10. The conveyance belt 18 is configured to feed the electric wire 5 forward in conjunction with the feeder 2. Specifically, the conveyance belt 18 is configured to run forward when the feeder 2 feeds the electric wire 5 forward. A portion of the electric wire 5 is placed on the conveyance belt 18 and conveyed forward with the running of the conveyance belt 18.

The clamps 3F and 3R are disposed forward of the feeder 2. The clamps 3F and 3R grip the electric wire 5 fed from the feeder 2. The clamps 3F and 3R are able to grip the electric wire 5 and release its grip on the electric wire 5.

The clamp 3F is disposed rearward of the cutter device 10. The clamp 3R is disposed forward of the cutter device 10. The clamp 3F is configured to be able to turn around a turning center CF. The clamp 3R is configured to be able to turn around a turning center CR. Each of the turning centers CF and CR is a vertical line that extends vertically. Although not illustrated, the electric wire processing apparatus 1 includes: an actuator to open and close the clamp 3F (i.e., an actuator to cause the clamp 3F to grip the electric wire 5 and release its grip on the electric wire 5); an actuator to cause the clamp 3F to turn; an actuator to open and close the clamp 3R; and an actuator to cause the clamp 3R to turn. Such actuators are well known and will thus not be described any further. The clamp 3F turns while gripping the front end of the rear side electric wire 5 that has been cut, thus conveying the front end of the electric wire 5 to the stripping edge 12F, the seal fitter 15F, and the terminal crimper 4F. The clamp 3R turns while gripping the rear end of the front side electric wire 5 that has been cut, thus conveying the rear end of the electric wire 5 to the stripping edge 12R, the seal fitter 15R, and the terminal crimper 4R.

The electric wire processing apparatus 1 includes a conforming/nonconforming determiner 14 to determine whether the electric wire 5 has been processed successfully. In the present embodiment, the conforming/nonconforming determiner 14 is configured to determine whether the electric wire 5 has been cut successfully, whether the electric wire 5 has been stripped of the insulator 5b successfully, whether a waterproof seal has been fitted to the electric wire 5 successfully, and whether a terminal has been crimped to the electric wire 5 successfully. The conforming/nonconforming determiner 14 does not necessarily have to make determinations on whether all of the cutting, stripping, waterproof seal fitting, and terminal crimping processes have been performed successfully but may be configured to make a determination on at least one of the processes. Such a determiner is well known and will thus not be described in detail.

Figure 3:
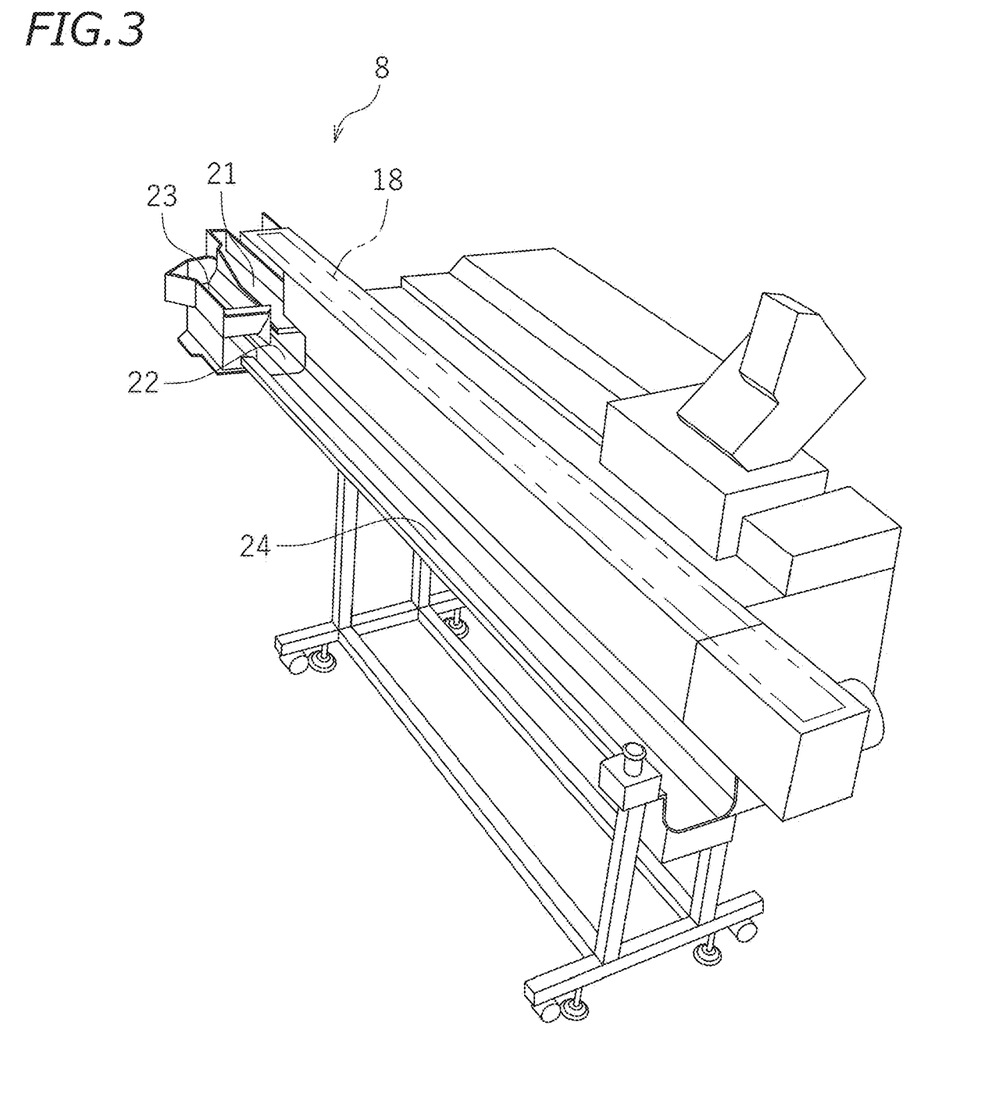
FIG. 3 is a perspective view of a collecting device.
Figure 4:
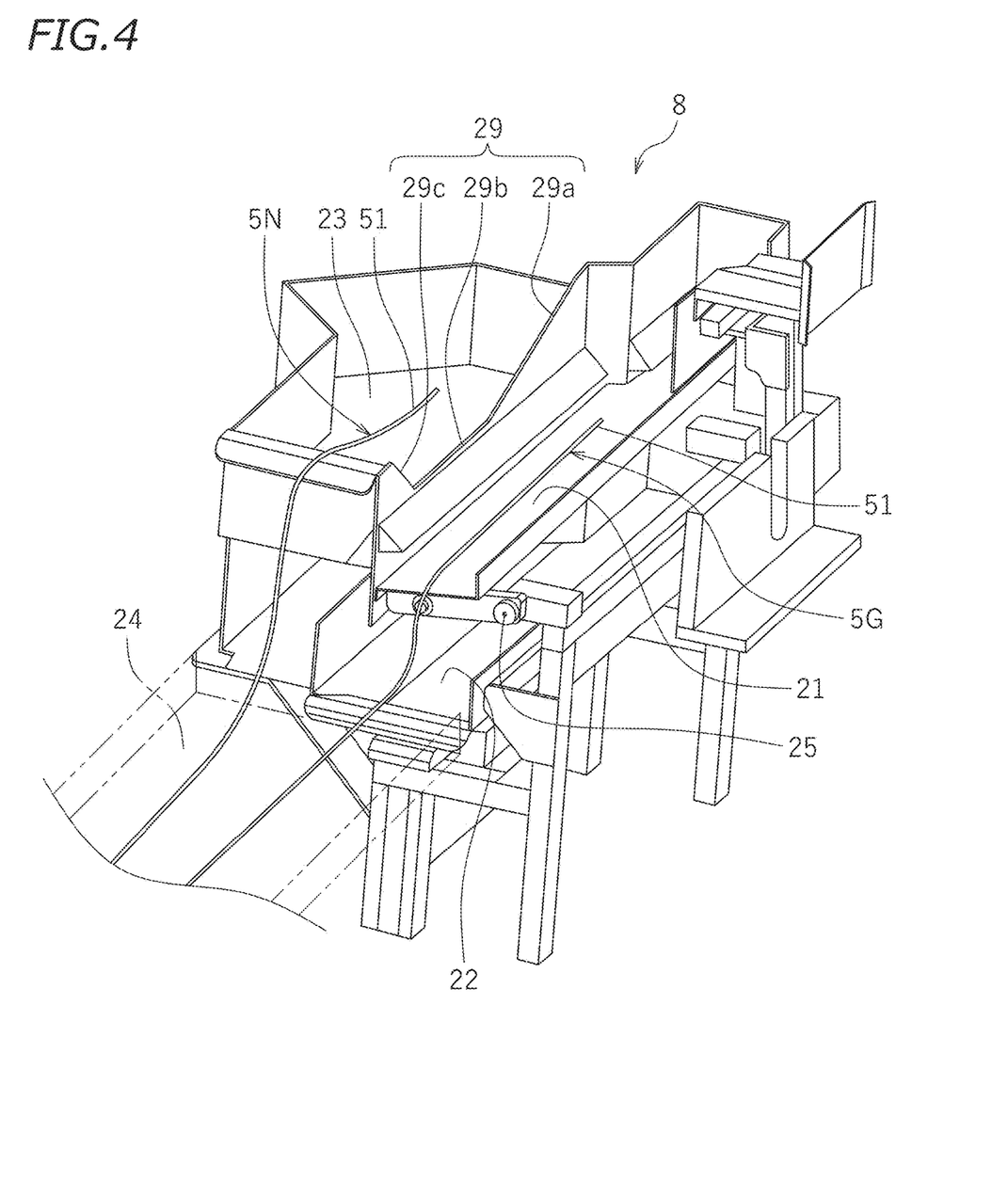
FIG. 4 is a perspective view of the rear portion of the collecting device.

The collecting device 8 will now be described. The collecting device 8 collects the electric wire 5 that has been processed. FIG. 3 is a perspective view of the collecting device 8. FIG. 4 is an enlarged perspective view of the rear portion of the collecting device 8.

Figure 5:
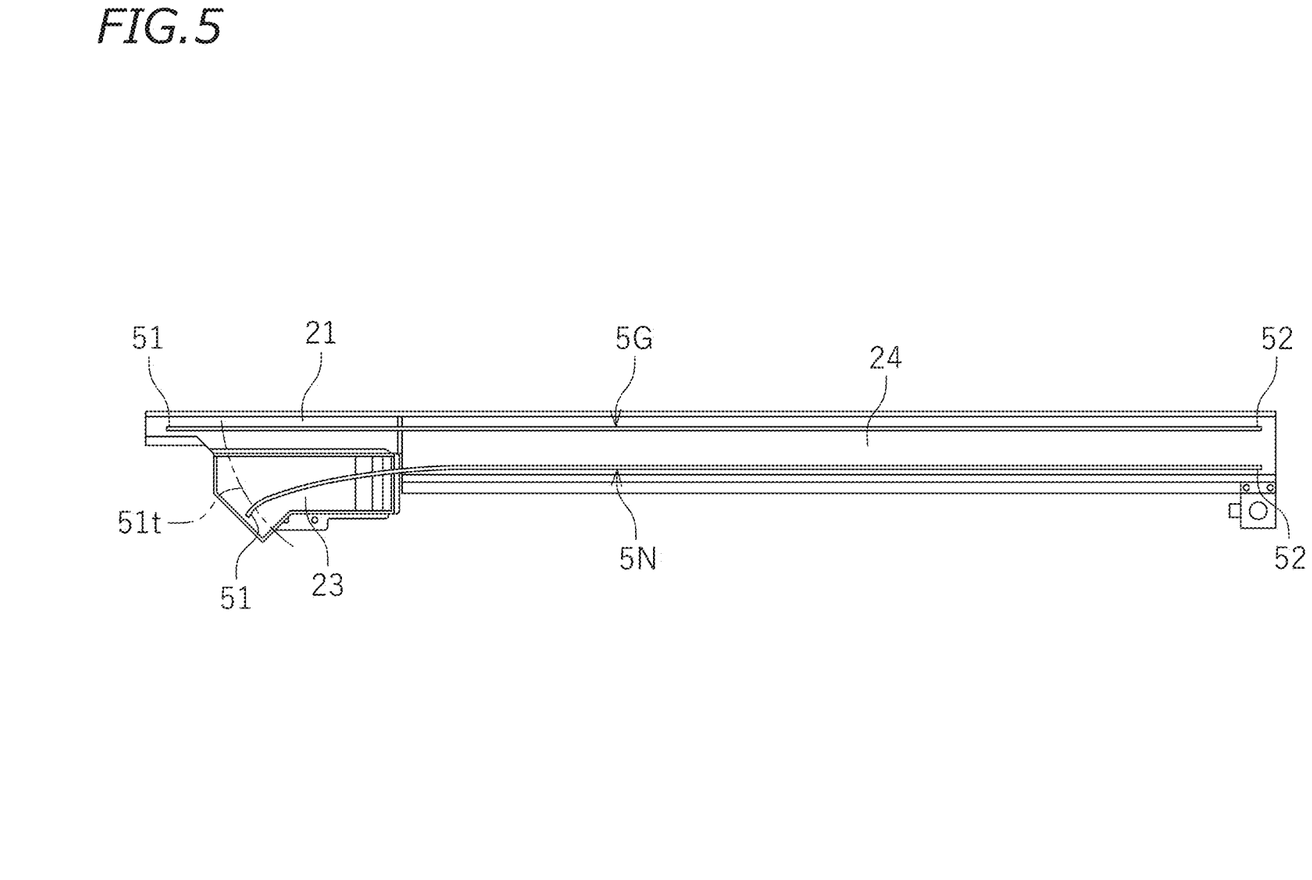
FIG. 5 is a plan view of an upper tray, a nonconforming item tray, and a shared tray of the collecting device.

As illustrated in FIG. 4, the collecting device 8 includes: an upper tray 21; a lower tray 22 disposed under the upper tray 21; and a nonconforming item tray 23 disposed laterally of the upper tray 21 (i.e., leftward of the upper tray 21 in the present embodiment). As illustrated in FIG. 3, the collecting device 8 further includes a shared tray 24. The upper tray 21, the lower tray 22, the nonconforming item tray 23, and the shared tray 24 are disposed laterally of the conveyance belt 18 (i.e., leftward of the conveyance belt 18 in the present embodiment). FIG. 5 is a plan view of the upper tray 21, the lower tray 22, the nonconforming item tray 23, and the shared tray 24. The shared tray 24 is disposed forward of the upper tray 21 and the nonconforming item tray 23. The shared tray 24 is disposed forward of the lower tray 22 (see FIG. 3). A portion of the shared tray 24 is in straight alignment with the upper tray 21 and the lower tray 22 in a front-rear direction. Another portion of the shared tray 24 is in straight alignment with the nonconforming item tray 23 in the front-rear direction.

As illustrated in FIG. 1, turning of the clamp 3R around the turning center CR causes a rear end 51 of the electric wire 5 gripped by the clamp 3R to move between a position in front of the cutting edge 11 and a position in front of the terminal crimper 4R. The rear end of the front side electric wire 5 that has been cut will hereinafter be referred to as a "first end". The front end of the front side electric wire 5 that has been cut will hereinafter be referred to as a "second end". A virtual line 51t in FIG. 5 indicates a movement path for the first end 51 of the electric wire 5. As illustrated in FIG. 5, the upper tray 21 and the nonconforming item tray 23 are disposed under the movement path 51t for the first end 51.

Figure 6:
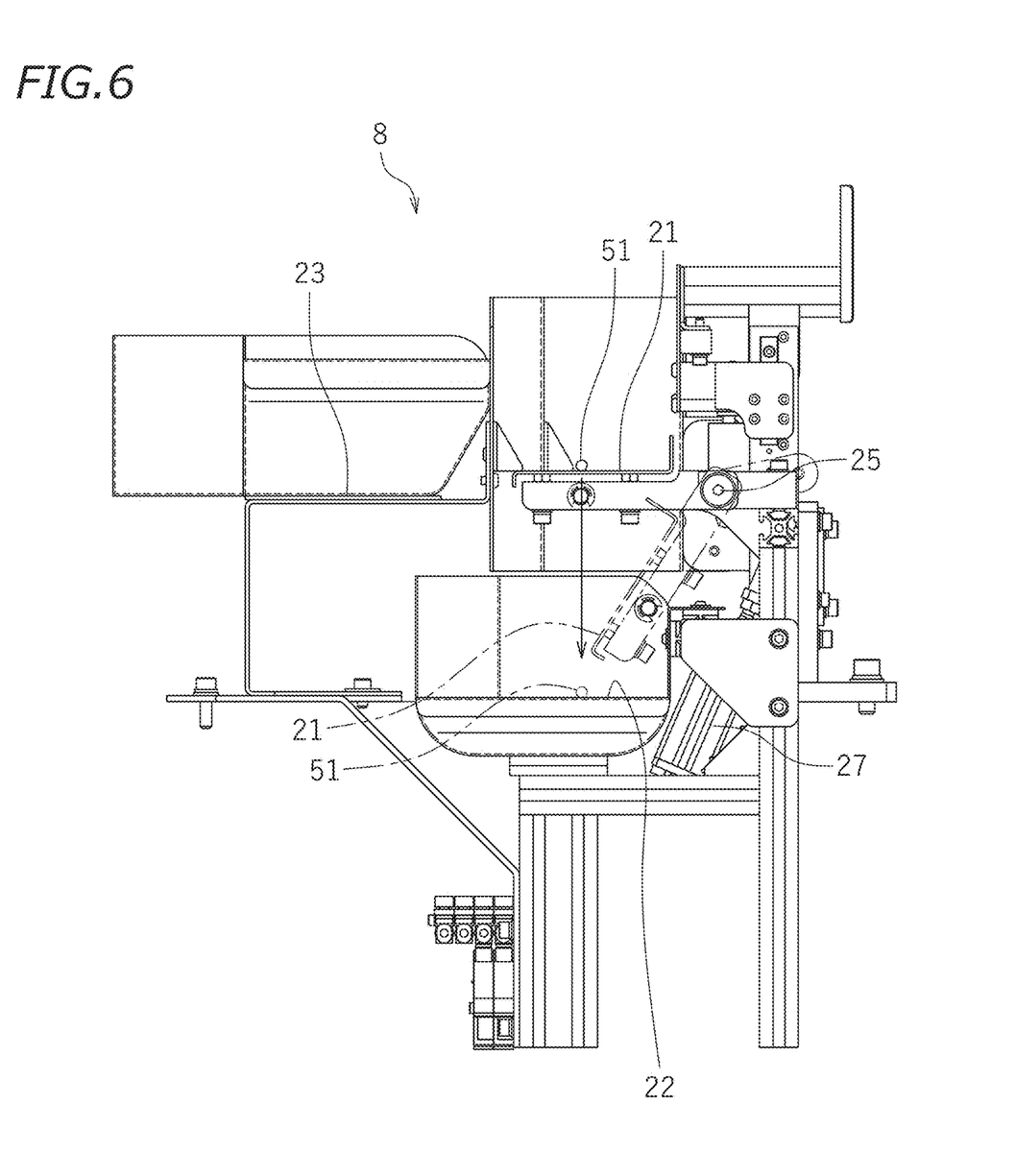
FIG. 6 is a front view of the rear portion of the collecting device.
Figure 7:
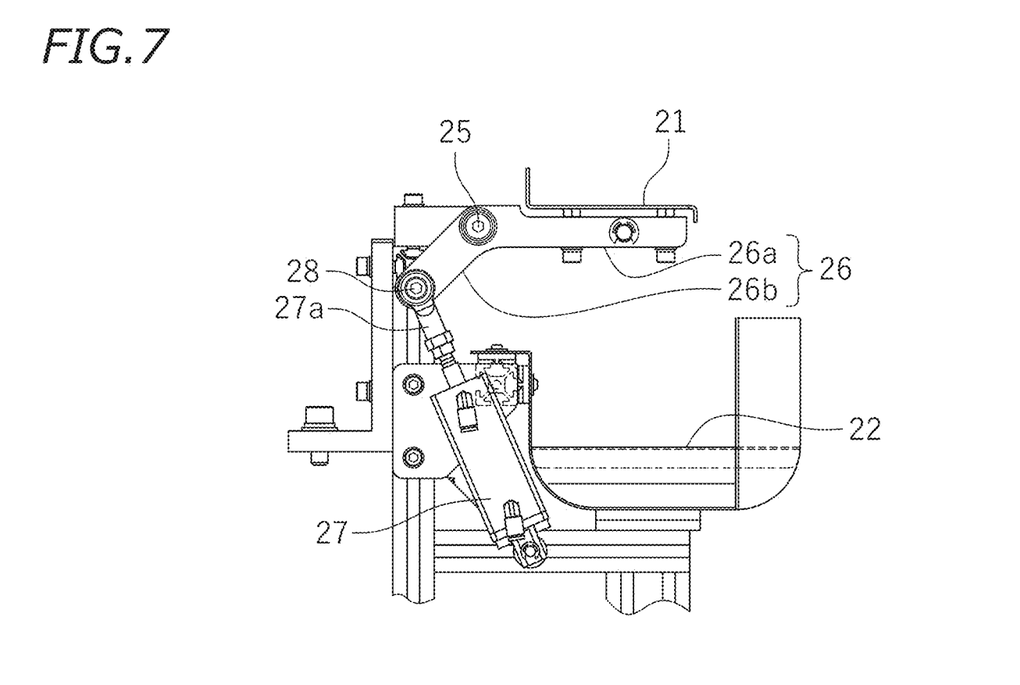
FIG. 7 is a partial rear view of the rear portion of the collecting device.

FIG. 6 is a front view of the rear portion of the collecting device 8 as viewed from the front to the rear. FIG. 7 is a partial rear view of the rear portion of the collecting device 8 as viewed from the rear to the front. As illustrated in FIG. 6, the upper tray 21 is configured to be able to rotate around a rotation shaft 25 extending in the front-rear direction. Specifically, as illustrated in FIG. 7, the collecting device 8 includes a supporting arm 26 supporting the upper tray 21. The supporting arm 26 includes: a support 26a supporting the upper tray 21; and a connector 26b rotatably connected to a rod 27a of an air cylinder 27 through a connecting shaft 28. The rotation shaft 25 is disposed between the support 26a and the connector 26b. Extending the rod 27a of the air cylinder 27 rotates the supporting arm 26 around the rotation shaft 25 in the clockwise direction in FIG. 7 (i.e., in the counterclockwise direction in FIG. 6). This rotates the upper tray 21 downward (see the virtual line in FIG. 6). In contrast, contracting the rod 27a of the air cylinder 27 rotates the supporting arm 26 around the rotation shaft 25 in the counterclockwise direction in FIG. 7 (i.e., in the clockwise direction in FIG. 6). This rotates the upper tray 21 upward (see the solid line in FIG. 6). The mechanism just described, however, is presented by way of example only. The upper tray 21 may be rotated by any other mechanism. The actuator for rotating the upper tray 21 is not limited to the air cylinder 27.

The lower tray 22 is disposed under the upper tray 21. Thus, upon rotation of the upper tray 21 as illustrated in FIG. 6, a portion of the electric wire 5 adjacent to the first end 51, which has been collected into the upper tray 21, falls and is collected into the lower tray 22.

Upon release of the electric wire 5 from the clamp 3R, with the first end 51 of the electric wire 5 located over the upper tray 21, the portion of the electric wire 5 adjacent to the first end 51 falls and is collected into the upper tray 21. During turning of the clamp 3R from the position in front of the cutter device 10 to the position in front of the terminal crimper 4R, the remaining portion of the electric wire 5 falls from a position on the conveyance belt 18 to the left (or specifically, a portion of the electric wire 5 close to the clamp 3R falls first, and then a portion of the electric wire 5 close to a second end 52 falls) and is collected into the shared tray 24. The shared tray 24 may be located higher or lower than the lower tray 22. In the present embodiment, the shared tray 24 is located at the same height as the lower tray 22. Thus, transferring the portion of the electric wire 5 adjacent to the first end 51 from the upper tray 21 to the lower tray 22 brings the electric wire 5 into a relatively straight state on the lower tray 22 and the shared tray 24.

As previously mentioned, the nonconforming item tray 23 is disposed under the movement path 51t for the first end 51 of the electric wire 5 and laterally of the upper tray 21. In the present embodiment, the nonconforming item tray 23 is disposed leftward of the upper tray 21. Upon release of the electric wire 5 from the clamp 3R, with the first end 51 of the electric wire 5 located over the nonconforming item tray 23, the portion of the electric wire 5 adjacent to the first end 51 falls and is collected into the nonconforming item tray 23. During turning of the clamp 3R from the position in front of the cutter device 10 to the position in front of the terminal crimper 4R, the remaining portion of the electric wire 5 falls from a position on the conveyance belt 18 to the left and is collected into the shared tray 24. The nonconforming item tray 23 may be located at any height. In the present embodiment, the nonconforming item tray 23 is disposed higher than the shared tray 24.

As illustrated in FIG. 5, the longitudinal dimensions of the upper tray 21 and the nonconforming item tray 23 (i.e., the dimensions of the upper tray 21 and the nonconforming item tray 23 in the front-rear direction in this embodiment) are each shorter than the longitudinal dimension of the shared tray 24. The breadth of the shared tray 24 (i.e., the dimension of the shared tray 24 in the transverse direction in this embodiment) is longer than the breadth of each of the upper tray 21 and the nonconforming item tray 23 (i.e., the dimension of each of the upper tray 21 and the nonconforming item tray 23 in the transverse direction in this embodiment).

As illustrated in FIG. 4, a partition wall 29 extending in an up-down direction and the front-rear direction is provided between the upper tray 21 and the nonconforming item tray 23. The upper edge of the partition wall 29 includes: an inclined portion 29a; a horizontal portion 29b located forward of the inclined portion 29a; and an inclined portion 29c located forward of the horizontal portion 29b. The inclined portion 29a inclines downward as it extends forward. In other words, the inclined portion 29a inclines downward as it extends toward the shared tray 24. The inclined portion 29c inclines upward as it extends forward. In other words, the inclined portion 29c inclines upward as it extends toward the shared tray 24.

As previously described, the conforming/nonconforming determiner 14 determines whether the electric wire 5 has been processed successfully. Upon determination that the electric wire 5 gripped by the clamp 3R is a conforming item, the controller 9 controls the clamp 3R such that the clamp 3R releases its grip on the electric wire 5, with the first end 51 of the electric wire 5 located over the upper tray 21. Upon determination that the electric wire 5 gripped by the clamp 3R is a nonconforming item, the controller 9 controls the clamp 3R such that the clamp 3R releases its grip on the electric wire 5, with the first end 51 of the electric wire 5 located over the nonconforming item tray 23. The clamp 3R may release its grip on the electric wire 5 during return of the first end 51 of the electric wire 5 from the position in front of the terminal crimper 4R to the position in front of the cutting edge 11. Upon determination that the process of cutting the electric wire 5, stripping off the insulator 5b, or fitting a waterproof seal has been performed unsuccessfully before terminal crimping, the clamp 3R may release its grip on the electric wire 5 during movement of the first end 51 toward the position in front of the terminal crimper 4R. The timing for the clamp 3R to release its grip on the electric wire 5 for collection may be any other timing.

The electric wire processing apparatus 1 sequentially and continuously produces the electric wires 5 whose ends have the terminals 7 crimped thereto. The following description discusses how the electric wire processing apparatus 1 operates. First, the feeder 2 and the conveyance belt 18 feed the electric wire 5 forward (i.e., rightward in FIG. 1). The electric wire 5 is gripped by the clamps 3F and 3R and cut into electric wires 5 with the cutting edge 11 of the cutter device 10.

The clamp 3F then turns rightward (i.e., upward in FIG. 1) while gripping the associated electric wire 5 that has been cut, thus guiding the front end of the associated electric wire 5 to the stripping edge 12F. The clamp 3R turns leftward (i.e., downward in FIG. 1) while gripping the associated electric wire 5, thus guiding the rear end of the associated electric wire 5 to the stripping edge 12R. The stripping edges 12F and 12R each strip the insulator 5b from the end of the associated electric wire 5.

The clamp 3F then turns further rightward while gripping the associated electric wire 5, thus guiding the front end of the associated electric wire 5 to a position in front of the seal fitter 15F. The clamp 3R turns further leftward while gripping the associated electric wire 5, thus guiding the rear end of the associated electric wire 5 to a position in front of the seal fitter 15R. The seal fitters 15F and 15R each fit a waterproof seal to the end of the associated electric wire 5.

The clamp 3F then turns further rightward while gripping the associated electric wire 5, thus guiding the front end of the associated electric wire 5 to a position in front of the terminal crimper 4F as indicated by the corresponding virtual line in FIG. 1. The clamp 3R turns further leftward while gripping the associated electric wire 5, thus guiding the rear end of the associated electric wire 5 to a position in front of the terminal crimper 4R as indicated by the corresponding virtual line in FIG. 1. The terminal crimpers 4F and 4R each crimp the terminal 7 to the end of the associated electric wire 5.

The clamp 3F subsequently returns to its initial position facing the cutting edge 11 (i.e., the position indicated by the corresponding solid line in FIG. 1) while gripping the associated electric wire 5 having the terminal 7 crimped thereto, and releases its grip on the associated electric wire 5.

The clamp 3R turns to its initial position, which faces the cutting edge 11, while gripping the associated electric wire 5. Upon determination by the conforming/nonconforming determiner 14 that the associated electric wire 5 is a conforming item, the clamp 3R releases its grip on (or releases) the associated electric wire 5 when the clamp 3R has reached a position over the upper tray 21. As a result, a portion of the conforming electric wire 5G adjacent to the first end 51 is collected into the upper tray 21 (see FIG. 4), and an entirety of the conforming electric wire 5G is thus collected partly into the upper tray 21 and partly into the shared tray 24 (see FIG. 5). In FIGS. 4 and 5, the waterproof seals fitted to the electric wires 5G and 5N and the terminals crimped to the electric wires 5G and 5N are not illustrated.

Upon determination by the conforming/nonconforming determiner 14 that the associated electric wire 5 is a nonconforming item, the clamp 3R releases its grip on the associated electric wire 5 when the clamp 3R has reached a position over the nonconforming item tray 23. As a result, a portion of the nonconforming electric wire 5N adjacent to the first end 51 is collected into the nonconforming item tray 23 (see FIG. 4), and an entirety of the nonconforming electric wire 5N is thus collected partly into the nonconforming item tray 23 and partly into the shared tray 24 (see FIG. 5).

After having released the associated electric wire 5, the clamp 3R returns to the initial position. The electric wire processing apparatus 1 then repeats the operations described above. The electric wire processing apparatus 1 thus sequentially and continuously produces the electric wires 5 whose ends have the terminals 7 crimped thereto.

After a predetermined number of the electric wires 5 have been processed, the controller 9 drives the air cylinder 27 so as to rotate the upper tray 21 downward. Thus, the portion of each conforming electric wire 5G adjacent to the first end 51, which has been collected into the upper tray 21, falls and is transferred to the lower tray 22 (see FIG. 6). As a result, each conforming electric wire 5G is collected into the lower tray 22 and the shared tray 24. The controller 9 subsequently drives the air cylinder 27 so as to rotate the upper tray 21 upward. The upper tray 21 then collects the portion of each conforming electric wire 5G adjacent to the first end 51 again.

The portion of the conforming electric wire 5G adjacent to the first end 51 is collected into the lower tray 22, and the portion of the nonconforming electric wire 5N adjacent to the first end 51 is collected into the nonconforming item tray 23. This enables a user to make a clear distinction between the conforming electric wire 5G and the nonconforming electric wire 5N. The user is thus able to remove the conforming electric wire 5G from the lower tray 22 and the shared tray 24 without making any mistake. The user is also able to remove the nonconforming electric wire 5N from the nonconforming item tray 23 and the shared tray 24 without making any mistake. Accordingly, the user is able to appropriately sort the electric wires 5 into the conforming and nonconforming electric wires 5G and 5N.

As described above, the electric wire processing apparatus 1 according to the present embodiment collects the portion of the conforming electric wire 5G (hereinafter simply referred to as a "conforming item 5G") adjacent to the first end 51 into the upper tray 21, and collects the portion of the nonconforming electric wire 5N (hereinafter simply referred to as a "nonconforming item 5N") adjacent to the first end 51 into the nonconforming item tray 23. The electric wire processing apparatus 1 thus sorts the portion of the conforming item 5G adjacent to the first end 51 from the portion of the nonconforming item 5N adjacent to the first end 51. Because each of the conforming and nonconforming items 5G and 5N is the electric wire 5 that is long, the electric wire processing apparatus 1 does not necessarily have to sort an entirety of each item. The electric wire processing apparatus 1 is able to make a clear distinction between the conforming and nonconforming items 5G and 5N as a whole by accurately sorting a portion of each item adjacent to the first end 51 (see FIGS. 4 and 5). Consequently, the electric wire processing apparatus 1 is able to appropriately sort the conforming item 5G from the nonconforming item 5N.

The electric wire processing apparatus 1 collects the remaining portion of each of the conforming and nonconforming items 5G and 5N into the shared tray 24. Portions of the conforming and nonconforming items 5G and 5N adjacent to the second ends 52 are all collected into the same tray (i.e., the shared tray 24). Thus, unlike the case where an entirety of each conforming electric wire 5G and an entirety of each nonconforming electric wire 5N are separately collected into different trays, each second end 52 will not be collected into a wrong tray. The portion of each item adjacent to the second end 52 will not run onto a region between two trays. Accordingly, the electric wire processing apparatus 1 reduces the possibility that the portion of the conforming electric wire 5G adjacent to the first end 51 will be pulled toward the second end 52 and transferred from the upper tray 21 to the nonconforming item tray 23. The electric wire processing apparatus 1 also reduces the possibility that the portion of the nonconforming electric wire 5N adjacent to the first end 51 will be pulled toward the second end 52 and transferred from the nonconforming item tray 23 to the upper tray 21. Consequently, the electric wire processing apparatus 1 is able to correctly collect the portion of each conforming item 5G adjacent to the first end 51 into the upper tray 21 and correctly collect the portion of each nonconforming item 5N adjacent to the first end 51 into the nonconforming item tray 23.

Accordingly, the electric wire processing apparatus 1 is able to collect the conforming and nonconforming items 5G and 5N such that the portion of the conforming item 5G adjacent to the first end 51 is correctly sorted from the portion of the nonconforming item 5N adjacent to the first end 51, and is thus able to appropriately sort the conforming item 5G from the nonconforming item 5N.

In the present embodiment, the partition wall 29 extending in the up-down direction serves as a partition between the upper tray 21 and the nonconforming item tray 23 as illustrated in FIG. 4. The electric wire processing apparatus 1 is thus able to accurately sort, with the partition wall 29, the portion of the conforming item 5G adjacent to the first end 51 from the portion of the nonconforming item 5N adjacent to the first end 51.

Figure 8:
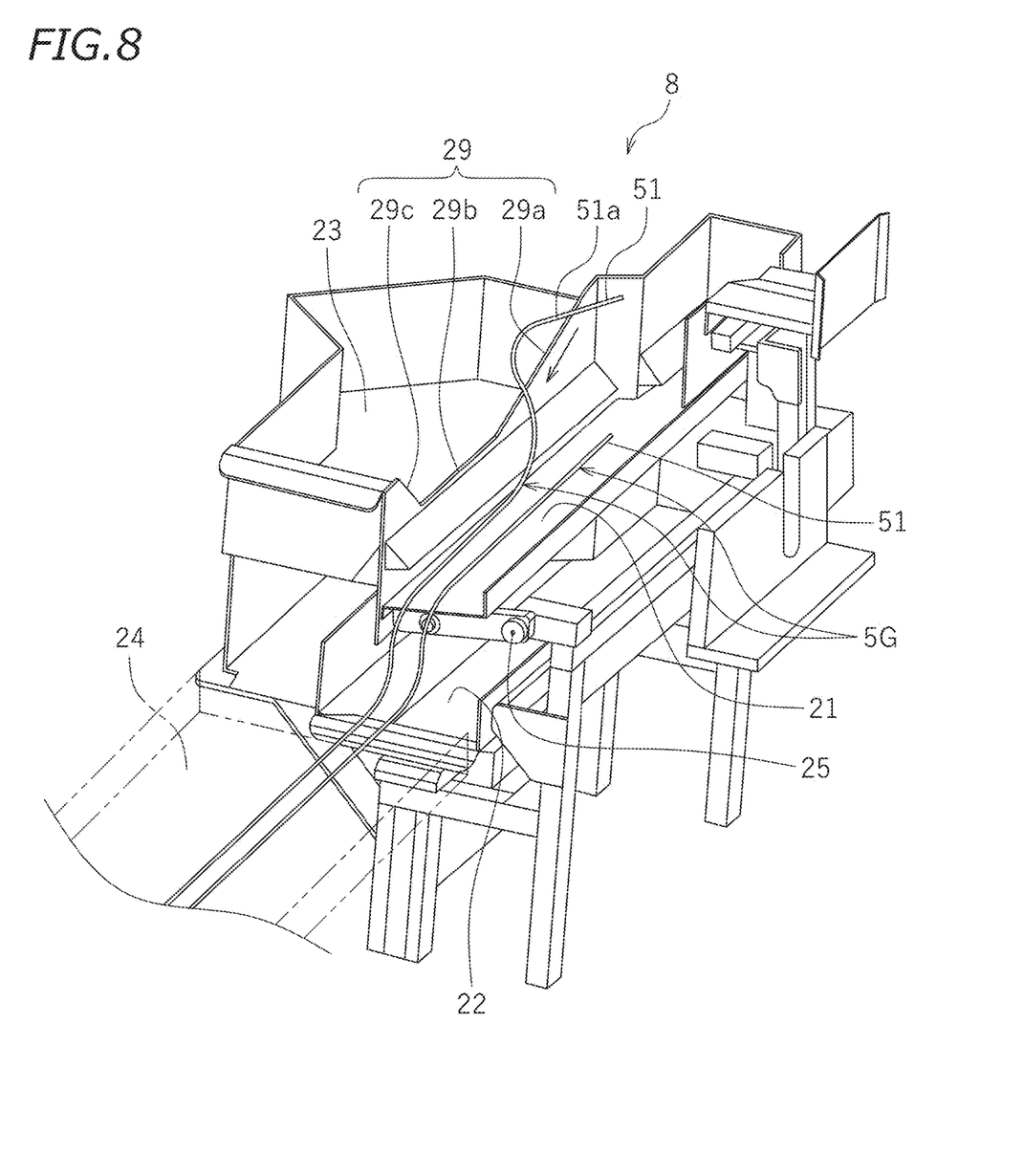
FIG. 8 is a perspective view of the rear portion of the collecting device, illustrating a first end side portion of an electric wire that has fallen on the upper edge of a partition wall.

In the present embodiment, the upper edge of the partition wall 29 includes the inclined portion 29a that inclines downward as it extends toward the shared tray 24 (i.e., forward). The electric wire 5 is long and may thus sway when the portion of the electric wire 5 adjacent to the first end 51 falls upon being released from the clamp 3R. In such a case, a portion 51a of the conforming item 5G adjacent to the first end 51 may bend and fall on the inclined portion 29a of the upper edge of the partition wall 29 as illustrated in, for example, FIG. 8. If the portion 51a of the conforming item 5G has fallen on the inclined portion 29a, however, the portion 51a would then slide down along the inclination of the inclined portion 29a (see the arrow in FIG. 8). As a result, the portion of the conforming item 5G adjacent to the first end 51 will be collected into the upper tray 21. The same goes for the nonconforming item 5N. If a bent portion of the nonconforming item 5N has fallen on the inclined portion 29a of the partition wall 29, the bent portion would slide down along the inclined portion 29a and would thus be collected into the nonconforming item tray 23. Accordingly, if the portion of the electric wire 5 adjacent to the first end 51 sways when the clamp 3R releases its grip on the electric wire 5, the portion of the conforming item 5G adjacent to the first end 51 would be successfully collected into the upper tray 21, and the portion of the nonconforming item 5N adjacent to the first end 51 would be successfully collected into the nonconforming item tray 23.

In the present embodiment, the upper tray 21 is configured to allow the portion of the conforming item 5G adjacent to the first end 51, which has been collected, to fall. The lower tray 22 to receive the portion of the conforming item 5G adjacent to the first end 51, which has fallen, is disposed under the upper tray 21. The portion of the conforming item 5G adjacent to the first end 51, which has been collected into the upper tray 21, is thus transferable to the lower tray 22. While removing the conforming item 5G from the lower tray 22 and the shared tray 24, the user is able to collect the portion of another conforming item 5G adjacent to the first end 51 into the upper tray 21. Accordingly, the user does not have to deactivate the electric wire processing apparatus 1 in order to remove the conforming item 5G. Consequently, the electric wire processing apparatus 1 is able to achieve higher processing efficiency.

In the present embodiment, the clamp 3R, which grips the electric wire 5 during processing of the first end 51 of the electric wire 5, causes the portion of the electric wire 5 adjacent to the first end 51 to be collected into the upper tray 21 or the nonconforming item tray 23. The present embodiment thus eliminates the need to pass the portion of the electric wire 5 adjacent to the first end 51 between multiple clamps when the first end 51 of the electric wire 5 is processed and is then collected into the upper tray 21 or the nonconforming item tray 23. In other words, the portion of the electric wire 5 adjacent to the first end 51 does not have to be passed from one clamp to another clamp. This results in an increase in electric wire processing efficiency and a reduction in takt time.

Before starting an actual operation, the user may run a test operation to check whether the electric wire processing apparatus 1 operates successfully. An electric wire provided as a result of such a test operation (which will hereinafter be referred to as an "adjustment wire") is preferably collected into either the upper tray 21 or the nonconforming item tray 23. The user is able to remove the collected adjustment wire from the upper tray 21 or the nonconforming item tray 23 so as to make, for example, a visual check of the adjustment wire, thus determining whether the adjustment wire is conforming or nonconforming. Because the adjustment wire will usually be discarded, the adjustment wire may be collected into the nonconforming item tray 23 when a distinction is to be made between the adjustment wire and the conforming item 5G provided as a result of the actual operation. Accordingly, the electric wire processing apparatus 1 would be able to prevent mixing of the adjustment wire and the conforming item 5G if the user has started the actual operation without removing the adjustment wire after the test operation.

One embodiment has been described thus far. The above embodiment, however, is presented by way of example only. Various other embodiments are possible. Examples of other embodiments will be briefly described below.

In the above embodiment, the clamp 3R grips the electric wire 5 during processing of the first end 51 of the electric wire 5 and then causes the portion of the electric wire 5 adjacent to the first end 51 to be collected into the upper tray 21 or the nonconforming item tray 23. Alternatively, one clamp may grip the electric wire 5, and another clamp may cause the portion of the electric wire 5 adjacent to the first end 51 to be collected. In one example, following the processing of the first end 51 of the electric wire 5, a first clamp may pass the portion of the electric wire 5 adjacent to the first end 51 to a second clamp, and then the second clamp may cause the portion to be collected into the upper tray 21 or the nonconforming item tray 23. In this case, the second clamp corresponds to the clamp according to the present invention. Such an embodiment allows the first clamp to return to its initial position located in front of the cutter device 10 (i.e., the position indicated by the associated solid line in FIG. 1) while the second clamp causes the electric wire 5 to be collected into the upper tray 21 or the nonconforming item tray 23. The first clamp enables the start of processing of another electric wire 5 while the second clamp causes the processed electric wire 5 to be collected into the upper tray 21 or the nonconforming item tray 23. This allows the collection and processing of the electric wires 5 to proceed concurrently.

The electric wire processing apparatus 1 may include a cutter. Upon determination by the conforming/nonconforming determiner 14 that the electric wire 5 is nonconforming, the cutter cuts off the first end 51 from the nonconforming item 5N before the nonconforming item 5N is collected into the nonconforming item tray 23. In this case, the nonconforming item 5N from which the first end 51 has been cut off will be collected into the nonconforming item tray 23. The user is thus able to differentiate at a glance between the nonconforming item 5N from which the first end 51 has been cut off and the conforming item 5G including the first end 51. Accordingly, the user is able to easily distinguish the conforming item 5G from the nonconforming item 5N.

In the above embodiment, the upper tray 21 is configured to rotate upward and downward. The upper tray 21, from which the electric wire 5 is allowed to fall, does not necessarily have to be of a rotary type. The upper tray 21 may be of a sliding type. The upper tray 21 is not limited to any particular mechanism.

In the above embodiment, the upper tray 21 is configured to allow the electric wire 5 to fall therefrom, and the lower tray 22 is disposed under the upper tray 21. The upper tray 21 and the lower tray 22, however, are not limited to any particular configuration or location. The upper tray 21 may be configured such that the electric wire 5 is unable to fall therefrom, and the lower tray 22 may be optional. Alternatively, the upper tray 21 may be optional, and the electric wire processing apparatus 1 may be configured such that the portion of the conforming item 5G adjacent to the first end 51 is directly collected into the lower tray 22.

In the above embodiment, the clamp 3R to grip the portion of the electric wire 5 adjacent to the first end 51 is configured to turn around the turning center CR. The direction of movement of the clamp 3R, however, is not limited to a turning direction. In one example, the clamp 3R may be configured to move in a straight line.

In the above embodiment, the longitudinal dimensions of the upper tray 21, the lower tray 22, and the nonconforming item tray 23 are each shorter than the longitudinal dimension of the shared tray 24. Alternatively, the upper tray 21, the lower tray 22, and the nonconforming item tray 23 may each have any longitudinal dimension. The longitudinal dimension of at least one of the upper tray 21, the lower tray 22, and the nonconforming item tray 23 may be equal to or longer than the longitudinal dimension of the shared tray 24.

In the above embodiment, the breadths of the upper tray 21, the lower tray 22, and the nonconforming item tray 23 are each shorter than the breadth of the shared tray 24. Alternatively, the upper tray 21, the lower tray 22, and the nonconforming item tray 23 may each have any breadth. The breadth of at least one of the upper tray 21, the lower tray 22, and the nonconforming item tray 23 may be equal to or longer than the breadth of the shared tray 24.

The above embodiment has been described on the assumption that the electric wire 5 gripped by the clamp 3R (which is the front side electric wire after cutting) is processed unsuccessfully. If the electric wire 5 gripped by the clamp 3F (which is the rear side electric wire after cutting) is processed unsuccessfully, the subsequent processes, for example, may be performed as follows. First, the clamps 3F and 3R return to the initial positions (i.e., the positions indicated by the associated solid lines in FIG. 1), and then the feeder 2 feeds the electric wire 5 forward to such an extent that the clamp 3R is able to grip the electric wire 5. The clamps 3F and 3R grip the electric wire 5, and the electric wire 5 is cut with the cutting edge 11. The electric wire 5 is thus separated into an electric wire 5 gripped by the clamp 3F and a short electric wire 5 gripped by the clamp 3R. The clamp 3R subsequently turns and releases its grip on the short electric wire 5 over the nonconforming item tray 23. As a result, the short electric wire 5 that has been determined to be a nonconforming item is collected into the nonconforming item tray 23.

In the above embodiment, the upper tray 21 and the lower tray 22 serve as an example of a conforming item collector to collect a portion of the conforming item 5G adjacent to the first end 51, the nonconforming item tray 23 serves as an example of a nonconforming item collector to collect a portion of the nonconforming item 5N adjacent to the first end 51, and the shared tray 24 serves as an example of a shared collector to collect the remaining portions of the conforming and nonconforming items 5G and 5N. The shape of each of the conforming item collector, the nonconforming item collector, and the shared collector, however, does not necessarily have to be a box shape with a bottom wall and lateral walls. The collectors may each have any other shape.

The present invention is particularly effective in processing the electric wire 5 that is long. The present invention is also naturally applicable to the electric wire 5 that is short. The electric wire processing apparatus according to the present invention may process both of long and short electric wires.

REFERENCE SIGNS LIST 1 electric wire processing apparatus
3R clamp
5 electric wire
5a core
5b insulator
5G conforming electric wire
5N nonconforming electric wire
9 controller (clamp controller)
14 conforming/nonconforming determiner
21 upper tray (conforming item collector, upper collector)
22 lower tray (conforming item collector, lower collector)
23 shared tray (shared collector)
24 nonconforming item tray (nonconforming item collector)
29 partition wall
29a inclined portion
51 first end
51t movement path for first end
52 second end

The invention claimed is:

1. An electric wire processing apparatus comprising:
a processor to perform a predetermined process on an electric wire which includes a first end and a second end;
a clamp to grip a portion of the electric wire adjacent to the first end of the electric wire, the clamp being movable so as to convey the first end of the electric wire;
a conforming item collector disposed under a movement path for the first end of the electric wire that is being conveyed by the clamp, the conforming item collector being configured to collect a first end side portion of the electric wire when the electric wire is a conforming item;
a nonconforming item collector disposed under the movement path for the first end of the electric wire that is being conveyed by the clamp, the nonconforming item collector being configured to collect the first end side portion of the electric wire when the electric wire is a nonconforming item;
a shared collector disposed toward the second end of the electric wire relative to the conforming item collector and the nonconforming item collector, the shared collector being configured to collect a remaining portion of the electric wire when the electric wire is a conforming item and further configured to collect the remaining portion of the electric wire when the electric wire is a nonconforming item; and
a clamp controller to cause, upon determination that the electric wire is a conforming item, the clamp to release its grip on the portion of the electric wire adjacent to the first end of the electric wire when the first end is located over the conforming item collector, and to cause, upon determination that the electric wire is a nonconforming item, the clamp to release its grip on the portion of the electric wire adjacent to the first end of the electric wire when the first end is located over the nonconforming item collector; wherein
the conforming item collector includes:
an upper collector to collect the first end side portion of the electric wire and to allow the collected first end side portion of the electric wire to fall, and
a lower collector disposed under the upper collector, the lower collector being configured to collect the first end side portion of the electric wire that has fallen from the upper collector.

2. The electric wire processing apparatus according to claim 1, further comprising a partition wall disposed between the conforming item collector and the nonconforming item collector and extending in an up-down direction.

3. The electric wire processing apparatus according to claim 2, wherein
an upper edge of the partition wall includes an inclined portion that inclines downward as it extends toward the shared collector.

4. The electric wire processing apparatus according to claim 1, wherein
the electric wire includes:
a core made of a conductor, and
an insulator surrounding the core, and
the processor includes at least one of:
a device to cut the electric wire so as to provide the first end,
a device to strip the insulator from the first end of the electric wire,
a device to fit a seal to the first end of the electric wire, and
a device to crimp a terminal to the first end of the electric wire.

5. The electric wire processing apparatus according to claim 1, wherein
the clamp is configured to turn about a vertical line.

\* \* \* \* \*